(12) United States Patent
Brostmeyer

(10) Patent No.: US 7,909,566 B1
(45) Date of Patent: Mar. 22, 2011

(54) ROTOR THRUST BALANCE ACTIVATED TIP CLEARANCE CONTROL SYSTEM

(75) Inventor: Joseph Brostmeyer, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 919 days.

(21) Appl. No.: 11/787,560

(22) Filed: Apr. 17, 2007

Related U.S. Application Data

(60) Provisional application No. 60/794,172, filed on Apr. 20, 2006.

(51) Int. Cl.
*F01D 11/16* (2006.01)

(52) U.S. Cl. .................. 415/34; 415/132; 415/173.1

(58) Field of Classification Search .............. 415/131, 415/132, 34, 14, 107, 104, 106, 26, 96, 105, 415/129, 140, 219.1
See application file for complete search history.

(56) References Cited

U.S. PATENT DOCUMENTS

| 1,823,310 | A | | 9/1931 | Allen |
| 2,762,559 | A | | 9/1956 | Faught |
| 3,227,418 | A | | 1/1966 | West |
| 4,149,826 | A | | 4/1979 | Torstenfelt |
| 4,177,004 | A | | 12/1979 | Riedmiller et al. |
| 4,332,523 | A | | 6/1982 | Smith |
| 5,051,061 | A | | 9/1991 | Meylan |
| 5,203,673 | A | | 4/1993 | Evans |
| 5,330,320 | A | * | 7/1994 | Mansson ................. 415/131 |
| 5,836,739 | A | * | 11/1998 | Haramura et al. ........ 415/107 |
| 6,273,671 | B1 | | 8/2001 | Ress, Jr. |
| 6,676,372 | B2 | | 1/2004 | Scholz et al. |
| 2002/0009361 | A1 | * | 1/2002 | Reichert et al. ........... 415/110 |
| 2008/0247865 | A1 | * | 10/2008 | Fiala et al. ................ 415/131 |

* cited by examiner

*Primary Examiner* — Richard Edgar
(74) *Attorney, Agent, or Firm* — John Ryznic

(57) ABSTRACT

A gas turbine engine with a rotor shaft that is moveable in an axial direction so change a blade tip clearance, where the rotor is displaced by a spring to increase the blade tip clearance and is displaced by a pressure created by the compressor and turbine during engine operation that will close the blade tip clearance. This is especially useful during engine shutdown to prevent blade tip rubbing against the stationary shrouds.

9 Claims, 2 Drawing Sheets

ROTOR THRUST BALANCE ACTIVATED TIP CLEARANCE CONTROL SYSTEM

CROSS-REFERENCE TO RELATED APPLICATIONS

This application claims the benefit to an earlier filed Provisional Patent Application 60/794,172 filed on Apr. 20, 2006 and entitled ROTOR THRUST BALANCE ACTIVATED TIP CLEARANCE CONTROL SYSTEM.

BACKGROUND OF THE INVENTION

1. Field of the Invention

The present invention relates to gas turbine engines, and more specifically to a system to control a blade tip clearance in the turbine section.

2. Description of the Related Art Including Information Disclosed Under 37 CFR 1.97 and 1.98

A gas turbine engine such as those used in industrial application for electric power production and those used in aerospace for aircraft propulsion operate at improved efficiency if the blade tip clearance is kept to a minimum to prevent leakage of the gas stream past the blades. The blade tip clearance gap is not a continuous gap length during engine operation. The gap length changes due to different thermal growth coefficients between the rotor disk and the engine casing securing the outer shroud that forms the gap between the blade tips. During engine start-up, the stator (casing) will heat up faster and therefore will thermally expand faster than will the rotor shaft. The blade tip clearance gap will decrease during engine start-up. During steady-state full load operation, the gap will remain within a narrow range. During engine shut-down, the stator will shrink faster than the rotor disk, and therefore the blade tips will rub against the shroud casing. This rub during shut-down is a very undesirable situation because it causes the blade tips and the outer shroud segments to wear prematurely. In the case of other previously disclosed arrangements, although it has been possible to keep the thermally induced relative movements of the components low for many operating states by selecting suitable pairs of materials, it is also true there that an optimum rotor blade tip gap in each case prevails only in a specific steady state. In every other state, less beneficial conditions again occur.

Prior art techniques make use of abradable seals that will allow for rub without causing too much damage. However, abradable seals are an added expense to the engine. One such reference is U.S. Pat. No. 4,177,004 issued to Riedmiller et al on Dec. 4, 1979 which discloses a COMBINED TURBINE SHROUD AND VANE SUPPORT STRUCTURE in which a single turbo machine support structure provides both close tolerance radial positioning of a turbine shroud and close tolerance axial positioning of a vane. Radial movement of the vane without attendant radial movement of the shroud is accommodated by the use of surfaces designed to minimize constraint between the vane and the support structure. The linkage is further provided with cooling means to isolate thermal variations proximate the vane end thereof from the support structure end thereof.

Some of the known prior art systems and methods of controlling the blade tip clearance are those like U.S. Pat. No. 2,762,559 issued to Faught on Sep. 11, 1956 which discloses an AXIAL FLOW COMPRESSOR WITH AXIALLY ADJUSTABLE ROTOR. The rotor shaft carrying the blades that form the tip clearance is adjusted in an axial direction by a fluid powered cylinder based upon the engine RPM and/or the compressor outlet temperature. Because the blade tips and the shroud that forms the tip clearance are conical shaped, axial displacement of the rotor with respect to the stationary shroud will change the tip clearance.

U.S. Pat. No. 6,676,372 issued to Scholz et al. on Jan. 13, 2004 discloses a GAS TURBINE WITH AXIALLY MUTUALLY DISPLACEABLE GUIDE PARTS in which the shroud casing is axially displaced instead of the turbine blades via the rotor shaft as in the above Faught patent.

U.S. Pat. No. 5,330,320 issued to Mansson on Jul. 19, 1994 entitled METHOD AND A DEVICE IN ROTATING MACHINE discloses another method of controlling blade tip clearance in a gas turbine engine by axially displacing the rotor shaft. A piston is used to displace the rotor in the axial direction. When the machine has become heated after a start or after a load increase, the piston 9 is caused to be extended whereby the compressor part 4 with the rotor shaft 3 and the turbine disc 2 is moved towards the interior of the stator cone 16 and the clearance is reduced. The operation of the piston 9, for control of the blade tip clearance, can be performed either manually or automatically. Extension of the piston 9 may, for example, take place after a certain period of time after a start or when a certain power has been attained. Shortening of the piston 9 may, for example, take place in connection with a stop impulse being given to the machine.

U.S. Pat. No. 4,149,826 issued to Torstenfelt on Apr. 17, 1979 entitled GAS TURBINE discloses a gas turbine having a rotor and a stator, the stator defining a blade channel which is of generally conical configuration and being axially movable relative to the rotor. A thermal responsive means which is heated in accordance with the temperature of the gas in the turbine moves the stator and rotor axially relative to each other to vary the gap there between so as to maintain the clearance between the rotor blades and the stator housing within predetermined values. The gap is subject also to the rotational forces acting on the rotor blades.

U.S. Pat. No. 5,203,673 issued to Evans on Apr. 20, 1993 entitled TIP CLEARANCE CONTROL APPARATUS FOR A TURBO-MACHINE BLADE discloses an apparatus is provided for controlling rotating blade tip clearance in a turbo-machine utilizing conical tipped blades. The apparatus comprises an approximately conical blade ring mounted for axially sliding displacement in the turbo-machine cylinder. The conical blade ring encircles the tips of the rotating blades and forms a blade tip clearance there between. The tip clearance is controlled during operation of the turbo-machine by axially displacing the conical blade ring. Piston cylinders, actuated by pressurized fluid extracted from the turbo-machine, are used to displace the blade ring. Springs, adapted to bias the blade ring into a position of increased tip clearance, oppose the piston cylinder so that failure of the piston cylinder will not result in a loss of tip clearance. A blade tip clearance sensor transmits information on the tip clearance to a controller that automatically adjusts the blade ring axial position to continuously maintain the optimum tip clearance by regulating the pressure of the fluid supplied to the piston cylinders.

U.S. Pat. No. 6,273,671 issued to Ress, Jr. on Aug. 14, 2001 entitled BLADE CLEARANCE CONTROL FOR TURBOMACHINERY discloses a system that includes a gas turbine engine having a shroud and a rotor with one or more blades. The rotor rotates within the shroud to pressurize a fluid during operation of the engine. An electromagnetic actuator is also included that is operable to move the shroud relative to the rotor to adjust clearance between the shroud and blades. In addition, a controller is included in this system to determine a desired amount of clearance in accordance with an operating mode of the engine. The controller generates an actuation signal to change the clearance in correspondence with the desired amount. The electromagnetic actuator responds to the actuation signal to provide the desired amount of clearance.

None of the above mentioned references discloses a system to control blade tip clearance in a gas turbine engine in which the rotor is axially displaced due to pressure differences acting on the rotor from engine operations as in the present invention as disclosed below.

It is an object of the present invention to provide for a gas turbine engine with blade tip clearance control that is a function of an operating characteristic of the engine such as a pressure differential acting on a rotor disc.

It is another object of the present invention to provide for a gas turbine engine with blade tip clearance control for both the turbine blades and the compressor blades of the engine.

BRIEF SUMMARY OF THE INVENTION

The present invention is a gas turbine engine having a blade tip clearance control to regulate the gap between rotating blade tips and the outer shroud in which the turbine blades and the outer shroud are conical in shape such that relative displacement produces a change in the gap spacing. The rotor shaft is biased in an axial direction by a spring member where extension of the spring results in an increase in the gap spacing. During operation of the engine, different pressures are developed that act on the rotor shaft. These various pressures will displace the rotor shaft against the force of the spring and decrease the gap spacing. No external controls or monitoring of variables are needed in the present invention. The blade tip clearance is self regulating especially during engine shut-down to prevent rub. In a second embodiment, the rotor shaft is aligned in a vertical direction so that the weight of the rotor shaft biases the turbine blades to increase the gap. A counter weight spring biases the rotor shaft to oppose the bias produced by the rotor shaft weight so that a lower pressure force acting on the rotor shaft is required to displace the rotor shaft and change the gap.

DETAILED DESCRIPTION OF THE INVENTION

Figure 1:
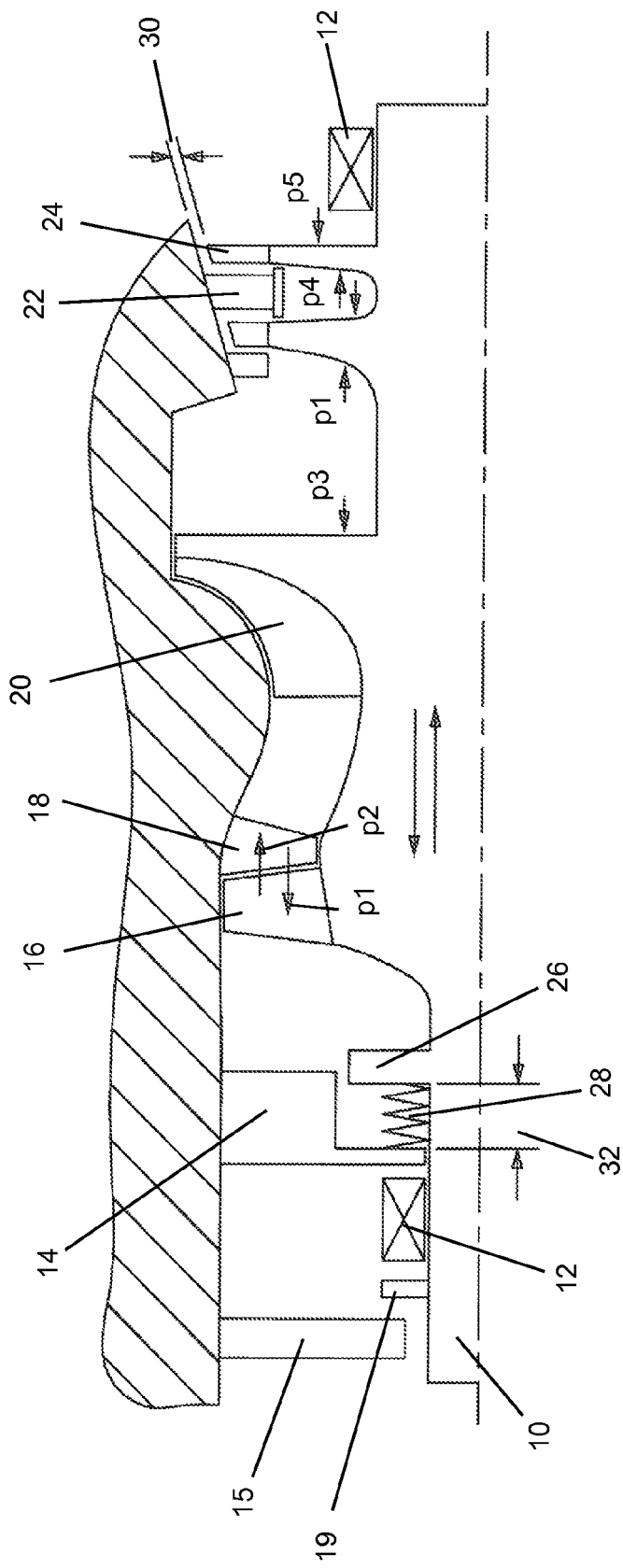
FIG. 1 shows a cross section view of a gas turbine engine with the axially biased rotor shaft.

The gas turbine engine of the present invention includes an axially displacable rotor shaft in which the turbine blade tip clearance is adjusted to minimize leakage across the gap and to prevent rub between the tips and the outer shroud during shut-down of the engine. The gas turbine engine includes a rotor shaft 10 on which a compressor and a turbine blade arrangement rotates therewith. The compressor includes guide vanes 14 and 18 and compressor blades 16. The turbine includes turbine blades 24 and guide vanes 22. One stage of compressor blades and two stages of turbine blades are shown in the drawing for purposes of illustration. In an actual gas turbine engine, multiple stages of compressor and turbine blades are used.

The rotor 10 is supported by front and rear bearings 12. An outer shroud of the engine supports a guide vane 14, and the compressor vanes 18 and turbine vanes 22. A centrifugal pump 20 is located upstream of a combustor section. The axial compressor with the axial blade 16 compresses air which is then compressed by the centrifugal compressor 20. Output of the centrifugal compressor 20 is then channeled into a combustor for burning with a fuel to produce the hot gas stream that passes through the turbine to produce rotation of the rotor shaft 10.

The outer shroud on which the turbine vanes 22 are supported is conical in shape, while the tips of the turbine blades 24 are also conical in shape. A tip clearance gap 30 is formed between the blade tips and the outer shroud. This gap 30 can be adjusted by axial movement of the rotor shaft 10 with respect to the stationary shroud. The rotor shaft 10 includes a projection 26, and a spring member 28 is positioned between the rotor projection 26 and a projecting arm 15 extending from the guide vane 14. The spring member 28 is under compression between the projections 15 and 26. When the engine is not operating, the spring will force the rotor shaft 10 towards the turbine side of the engine (right side in FIG. 1). When the engine is operating, air pressures build up at different points within the engine as represented by pressure p1 through p5. These pressure levels are only for illustrative purposes only. Other pressure areas will also occur within the engine that will effect the compression of the spring member 28 to a certain length 32. As pressure p1 through p5 build up in the engine during operation, each pressure will produce a force on the rotor shaft 10 that tends to move the rotor shaft 10 in an axial direction either toward the turbine section or toward the compressor section. For example, p3 acting on the upstream side of where the combustor would be located would act on the rear end of the rotor forming the centrifugal compressor 20. This pressure force will act to move the rotor shaft toward the compressor, acting to compress the spring member 28. All of these various pressure forces will produce a net force acting on the rotor shaft 10. When a proper engineering analysis has been done, a spring member having a specific spring constant k will be used between the projections 15 and 26 that will displace the rotor shaft 10 in the proper direction to control the tip clearance 30 such that rubbing will not occur during shut-down. To prevent rubbing during shut-down, the spring member 28 would need to force the rotor shaft 10 toward the turbine section so that the gap 30 will be increased and prevent rub. When the engine is near its operating level, the pressure forces will be enough to overcome the spring member 28 and the rotor shaft 10 will be displaced toward the compressor and, therefore, closing the gap 30 to the designed minimum.

An additional projection 19 extending from the rotor shaft 10 at a point on the left side of the projecting arm 15 can be used to limit the axial displacement of the rotor shaft 10 toward the turbine section during low pressure periods. Thus, the turbine blades will not bump against the turbine vanes directly downstream of the turbine blades.

Figure 2:
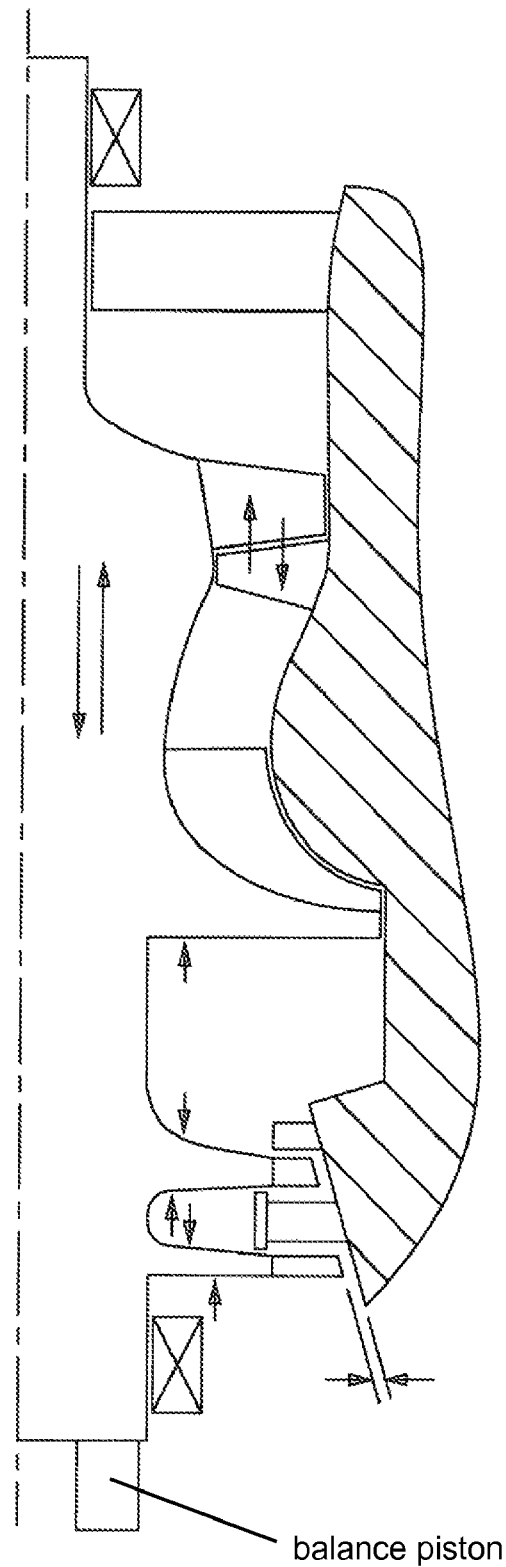
FIG. 2 shows a second embodiment of the present invention in which the rotor shaft is oriented in a vertical direction.

In another embodiment of the present invention shown in FIG. 2, a gas turbine engine with a vertical oriented rotor axis (i.e., the rotor axis in the FIG. 1 embodiment is a horizontal axis), the rotor would be biased toward the bottom of the rotor shaft (the turbine section) by the weight of the rotor shaft with the compressor and turbine blades instead of from the spring 28 in the FIG. 1 embodiment. A pressure differential acting on one or more of the rotor discs would displace the rotor disc upwards such that the compressor and turbine blade gaps would decrease. The pressure differential would overcome the weight of the rotor shaft in order to displace the blades and reduce the gap. A second spring bias could be included in the second embodiment to provide a bias to the rotor shaft acting to lift the rotor shaft against the weight. This second spring, also referred to as a counter weight spring, would allow for a lower pressure differential acting on the rotor disc in order to displace the rotor disc against the weight and decrease the blade tip gap. The counter weight spring could be sized to produce movement of the rotor shaft against the gravitational weight at a desired pressure differential acting on the rotor disc. FIG. 2 also shows the vertically oriented rotor shaft supported from the bottom of the rotor shaft by a hydraulic balancing piston which provides support against the weight of the rotor shaft. A combination of balancing pistons and balancing springs can also be used to support the vertical rotor shaft so that the blade tips will decrease at certain pressure ratios acting against the rotor discs.

I claim the following:

1. A gas turbine engine with a blade tip clearance control, the engine comprising:
   a rotor shaft extending along an axis of the engine;
   a turbine rotor disc having a plurality of turbine rotor blades extending therefrom;
   a turbine blade tip shroud forming a blade tip gap with the plurality of turbine rotor blades;
   a compressor rotor disc having a plurality of compressor blades extending therefrom;
   a rotor shaft bias means to bias the rotor shaft in a direction such that the turbine rotor blade tip clearance increases;
   a pressure force developed from the engine operation and acting on the compressor and turbine rotor discs to bias the rotor shaft in a direction such that the turbine rotor blade tip clearance decreases;
   the rotor shaft is a horizontal aligned rotor shaft; and,
   the rotor shaft bias means is a compression spring.

2. The gas turbine engine of claim 1, and further comprising:
   the compressor comprises a centrifugal compressor with compressor blades that form a blade tip gap with a compressor blade tip shroud; and,
   the displacement of the rotor shaft to decrease the turbine blade tip gap also decreases the compressor blade tip gap.

3. The gas turbine engine of claim 2, and further comprising:
   the centrifugal compressor rotor disc and the turbine blade rotor disc form pressure surfaces in which the pressure differential force is produced to displace the rotor shaft.

4. The gas turbine engine of claim 1, and further comprising:
   a plurality of stages of turbine rotor discs with turbine blades extending from the rotor discs, each with a blade tip formed at an angle; and,
   a stator cone having substantially the same angle as the turbine blade tips such that relative displacement of the rotor shaft produces a change in the blade tip gap.

5. A gas turbine engine with a blade tip clearance control, the engine comprising:
   a rotor shaft extending along an axis of the engine;
   a turbine rotor disc having a plurality of turbine rotor blades extending therefrom;
   a turbine blade tip shroud forming a blade tip gap with the plurality of turbine rotor blades;
   a compressor rotor disc having a plurality of compressor blades extending therefrom;
   a rotor shaft bias means to bias the rotor shaft in a direction such that the turbine rotor blade tip clearance increases;
   a pressure force developed from the engine operation and acting on the compressor and turbine rotor discs to bias the rotor shaft in a direction such that the turbine rotor blade tip clearance decreases;
   the rotor shaft is a vertical aligned rotor shaft;
   the rotor shaft bias means is the weight of the rotor shaft; and,
   a counter weight spring to bias the vertical aligned rotor shaft against the weight of the rotor shaft.

6. A process for controlling a blade tip clearance in a turbine of a gas turbine engine, the blade tips and a stator housing formed at an angle such that a relative displacement between the turbine blade tips and the stator housing will produce a change in the blade tip clearance, the process comprising the steps of:
   biasing the rotor shaft in a direction to increase the turbine blade tip clearance;
   producing a pressure force on the rotor discs of the engine to bias the rotor shaft in a direction to decrease the turbine blade tip clearance; and,
   biasing the rotor shaft in a direction to increase the turbine blade tip clearance includes applying a compression spring to the rotor shaft.

7. The process for controlling a blade tip clearance in a turbine of a gas turbine engine of claim 6, and further comprising the step of:
   biasing the rotor shaft in a direction to increase the turbine blade tip clearance includes orienting the rotor shaft in a vertical direction such that the weight of the rotor shaft produces the bias that increases the turbine blade tip clearance.

8. The process for controlling a blade tip clearance in a turbine of a gas turbine engine of claim 6, and further comprising the step of:
   producing the pressure force on the rotor discs of the engine in which the pressure force is a function of an operating condition of the engine.

9. A process for controlling a blade tip clearance in a turbine of a gas turbine engine, the blade tips and a stator housing formed at an angle such that a relative displacement between the turbine blade tips and the stator housing will produce a change in the blade tip clearance, the process comprising the steps of:
   biasing the rotor shaft in a direction to increase the turbine blade tip clearance;
   producing a pressure force on the rotor discs of the engine to bias the rotor shaft in a direction to decrease the turbine blade tip clearance;
   applying a counter weight bias to the rotor shaft to oppose the weight of the rotor shaft such that a lower differential pressure is required to displace the rotor shaft.

* * * * *